United States Patent [19]

Badia

[11] 4,086,148
[45] Apr. 25, 1978

[54] PROCESS OF MAKING ETCHED ALUMINUM SHEETS AND ELECTROLYTIC CAPACITORS FORMED THEREFROM

[75] Inventor: Michel Badia, Echirolles, France

[73] Assignee: Societe Anonyme de Traitement des Metaux et Alliages (SATMA), Goncelin, France

[21] Appl. No.: 743,128

[22] Filed: Nov. 19, 1976

[30] Foreign Application Priority Data

Dec. 8, 1975   France .................. 75 38228

[51] Int. Cl.$^2$ .............. C25D 11/04; C25F 3/04; H01G 9/00; C22C 21/00
[52] U.S. Cl. ........................... 204/33; 204/58; 75/138; 361/305
[58] Field of Search ......... 204/33, 129.35, 58, 204/38 A; 75/138; 317/230

[56] References Cited

U.S. PATENT DOCUMENTS

| 2,218,076 | 10/1940 | Werner | 175/315 |
| 2,977,294 | 3/1961 | Franklin | 204/58 |
| 3,031,387 | 4/1962 | Deal et al. | 204/33 |
| 3,530,048 | 9/1970 | Darrow | 204/33 |
| 3,997,339 | 12/1976 | Fickelscher | 75/138 |

FOREIGN PATENT DOCUMENTS 2,403,626   8/1975   Germany.

*Primary Examiner*—R. L. Andrews
*Attorney, Agent, or Firm*—Dennison, Dennison, Meserole & Pollack

[57] ABSTRACT

The invention concerns a new alloy composition prepared from refined aluminum which may be applied to the manufacture of thin sheets which are etched and shaped with a view to producing electrolytic capacitors. The alloy is formed by bringing the chromium content of a refined aluminum to a value between 0.002% and 0.2%, the other conventional impurities of refined aluminum being unchanged.

1 Claim, No Drawings

PROCESS OF MAKING ETCHED ALUMINUM SHEETS AND ELECTROLYTIC CAPACITORS FORMED THEREFROM

This invention relates to the production of etched aluminum sheets used for the manufacture of electrolytic capacitors.

The material most commonly used in Europe for the manufacture of these capacitors is refined aluminum in the form of this sheets ranging in thickness from 60 to 200 μ, which is obtained by rolling.

Refined aluminum is an aluminum of at least 99.99% purity in which the chief impurities are iron (from 0.0010% to 0.0020%), silicon (from 0.0015% to 0.0020%), and copper (approximately 0.0035%).

In the United States on the other hand, slightly different grades are also used for this application known as "under-refined" and correspond to Aluminum Association Standards 1193 and 1188. The standards for these alloys, compared with those of refined aluminum or 1199, are as follows (percentages):

| Alloys | Si | Fe | Cu | Mn | Mg | Zn | Ga | Ti | Other elements each | Al |
|---|---|---|---|---|---|---|---|---|---|---|
| 1188 | <0.06 | <0.06 | <0.005 | <0.01 | <0.01 | <0.03 | <0.03 | <0.01 | <0.01 | >99.88 |
| 1193 | <0.04 | <0.04 | <0.006 | — | — | <0.02 | <0.03 | — | <0.01 | >99.93 |
| 1199 | <0.006 | <0.006 | <0.006 | — | <0.006 | <0.006 | <0.005 | — | <0.002 | >99.99 |

The under-refined metals lead to leakage currents and dielectric losses which are more serious than those obtained with refined metal. It should also be noted that the content of other elements not mentioned in the tables must be less than 0.01% = 100 ppm.

After being rolled the aluminum sheets undergo two successive surface treatments. The first treatment consists of etching, i.e., subjecting the aluminum sheet to chemical or electro-chemical processes with a view to increasing its area by creating slight roughness. The electrical capacitance per unit area of sheet will obviously be roughly proportional to the actual area developed by the etching. The second treatment, which follows the etching operation, is described as a forming operation. This consists of applying a DC voltage to the previously etched sheet immersed in a suitable electrolyte, leading to formation of a very thin insulating layer of alumina which will act as a dielectric.

Apart from its electrical properties the sheet for producing capacitors must have other features. There is a growing demand for miniaturization and this leads to the use of thin metal which must necessarily have adequate mechanical properties and particularly good bending strength. The sheet must not be too fragile so that it does not split during the manufacture of the capacitors.

For applications of etched sheeting to low voltage capacitors, the metallurgical state which leads to the best performance in the field of capacitance is the cold-rolled state. In most cases a recovery heat treatment then has to be applied to the etched sheet to enable it to bend readily.

An object of this invention is to provide a new metal composition for low voltage use with chromium added to it enabling capacitance per unit area to be increased, bending properties to be improved, and the dielectric nature of the final product to be maintained.

The invention also covers etched or unetched aluminum sheets of this composition and capacitors made from them.

Applicant has found that the addition of chromium to refined aluminum, in sufficient quantities to bring the final chromium content to between 20 and 2000 ppm, has beneficial effects on both the electrical and mechanical properties of sheets which have been etched and formed. The addition of chromium unexpectedly produces a change in the shape of the etching as compared with that obtained with refined aluminum without chromium, and this results in an increase in the capacitance of the capacitor per unit area. At the same time, the addition of chromium strengthens the alloy, thus improving its mechanical properties and particularly the number of bends before breaking point.

Finally, unlike what happens when refined aluminum (1199) is replaced with under-refined (1193 or 1188), the dielectric nature of the final product (leakage current and dielectric losses) does not suffer.

The following example is intended to illustrate the invention and does not restrict it in any way.

EXAMPLE

Four different batches were made from one identical refined metal composition. Nothing is added to the first batch. In the second batch the chromium content is brought to 500 ppm by adding mother alloy containing 4% of chromium. In the third batch the chromium content is brought to 1000 ppm, and in the fourth batch the chromium content is brought to 2000 ppm.

A rolling plate is cast from each of the four batches in a continuous casting process. Each plate is then rolled hot then cold to a thickness of 90 μm. The sheet obtained, still in the cold-rolled state, is degreased, then subjected to conventional etching treatment at a high current density, e.g., in a bath containing sodium chloride and sodium sulfate, at 90°C. The dielectric layer is then formed by the usual methods.

The capacitance of the resultant sheets per square decimeter of area at 30 volts is measured and the number of bends before breaking point is noted. The results are set out in the table below.

| Metal | Refined Al without any addition | Refined Al 500 ppm of Cr | Refined Al 1000 ppm of Cr | Refined Al 2000 ppm of Cr |
|---|---|---|---|---|
| Capacitance at 30 volts (μF/dm$^2$) | 1640 | 1700 | 1750 | 1800 |
| Number of bends | 18 | 27 | 30 | 30 |

This example shows that the addition of 2000 ppm of chromium brings an increase of about 10% in capacitance, and an increase of 70% in the number of bends.

Capacitance may be increased by 25% (instead of 10%) if the current density is increased during the etching operation. The number of bends is not affected.

The usual tests for assessing the dielectric property of the sheets obtained (e.g., the charging time) show the dielectric property to be maintained despite the addition of up to 0.2% (2000 ppm) of chromium. In tests for storage under tension, and ageing tests, capacitors made from these sheets behave in the same way as capacitors made from refined aluminum without any chromium.

I claim:

1. In a low voltage electrolylic capacitor formed of a cold-rolled electro-chemically etched, anodized sheet formed from a refined aluminum base alloy having an aluminum content of at least about 99.99% and including chromium, the improvement comprising said sheet having a final chromium content of between about 0.002% and about 0.2% and being formed by said cold-rolling and electro-chemical etching without intervening recrystallization annealing whereby said sheet imparts improved electrical and mechanical properties to the capacitor.

* * * * *